United States Patent
Podesva et al.

[11] 3,892,802
[45] July 1, 1975

[54] PROCESSES FOR MAKING BENZAMIDE COMPOUNDS

[75] Inventors: Ctirad Podesva, Montreal, Quebec;
Geza Kohan, La Salle, Quebec;
William T. Scott, Ville-de-Lery, Quebec, all of Canada

[73] Assignee: Delmar Chemicals Limited, Ville LaSalle, Canada

[22] Filed: Nov. 11, 1971

[21] Appl. No.: 197,986

Related U.S. Application Data

[63] Continuation-in-part of Ser. No. 4,587, Jan. 21, 1970, abandoned.

[52] U.S. Cl............................ 260/559 S; 260/326 A
[51] Int. Cl............................................. C07c 103/44
[58] Field of Search............................ 260/326, 559

*Primary Examiner*—Harry I. Moatz
*Attorney, Agent, or Firm*—Christen & Sabol

[57] ABSTRACT

4-Amino-5-halo-2-substituted benzamide compounds of the following general formula:

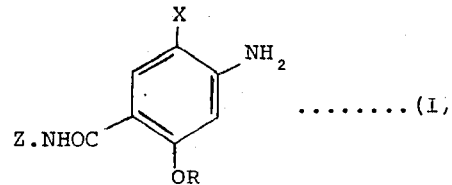

wherein X represents a chlorine or bromine atom, R represents a hydrogen atom or an alkyl group and Z is a tertiary aminoalkyl group, and non-toxic salts thereof, which are pharmacologically active, are prepared by novel and advantageous processes utilizing new phthaloylamido compounds of the following general formula:

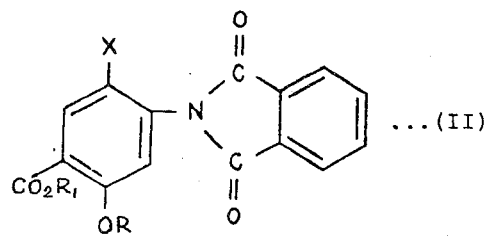

wherein X represents a chlorine or bromine atom, R represents a hydrogen atom or alkyl group and $R_1$ represents an alkyl group.

18 Claims, No Drawings

3,892,802

PROCESSES FOR MAKING BENZAMIDE COMPOUNDS

RELATED APPLICATION

This application is a continuation-in-part application of U.S. application Ser. No. 4,587, filed on Jan. 21, 1970, now abandoned.

BACKGROUND OF THE INVENTION

This invention relates generally to novel processes for making specific benzamide compounds in which novel phthaloylamido compounds are utilized. More particularly, the invention is concerned with novel processes for making N-(dialkylaminoalkyl)-2-substituted-4-amino-5-halobenzamide compounds of the following general formula:

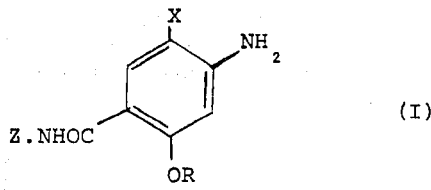

(I)

wherein X represents a chlorine or bromine atom, R represents a hydrogen atom or an alkyl group, preferably a lower alkyl group, and Z represents a tertiary aminoalkyl group. The benzamides being basic in character may subsequently be converted into non-toxic acid addition and quaternary ammonium salts.

Benzamide compounds, such as those of the general formula I above, are the subject of U.S. Pat. No. 3,177,252 and No. 3,357,978. In the former specification, the benzamide compounds are, in general terms, prepared by reacting a substituted acyl chloride with an appropriate asymmetric disubstituted diamine in an inert reaction medium from which the benzamide, in the form of the hydrochloride, can be recovered by filtration or centrifuging. According to the disclosure in the latter specification, the compounds are prepared from p-aminosalicylic acid, as the starting material, in a six-stage reaction sequence, involving initial esterification of the free acid, acetylation of the amino group, alkylation of the phenolic hydroxyl, halogenation with introduction of the appropriate nuclear substituent, say, chlorine, at position 5, aminolysis of the ester function by reaction with an amine of the general formula $Z.NH_2$ in which Z has the same significance as hereinbefore to form an amide, and finally desacetylation of the aromatic acetamido function by hydrolysis thereby liberating the free amine. Benzamide compounds of the general formula I are known to be pharmacologically active and some of them, especially N-(2-diethylaminoethyl)-2-methoxy-4-amino-5-chlorobenzamide, are useful in chemotherapy, broadly as regulators of the digestive system, and more specifically as antiemetics that may be used in the treatment of emesis associated with various conditions, such as motion or seasickness or sickness due to pregnancy. In this role, the benzamide compounds or non-toxic salts thereof are associated in pharmaceutical compositions with pharmaceutically acceptable organic or inorganic, solid or liquid carriers.

An object of this invention is to provide novel processes for making benzamide compounds of the foregoing general formula I which are generally simpler and more convenient than the processes described in the aforementioned United States patent specifications, and which afford a preferred benzamide compound, N-(2-diethylaminoethyl)-2-methoxy-4-amino-5-chlorobenzamide, in high yield.

Other objects and advantages of the invention will be apparent from the following description of the invention and the appended claims.

SUMMARY OF THE INVENTION

Accordingly, in one of its aspects, the present invention provides a process for making benzamide compounds of the following general formula:

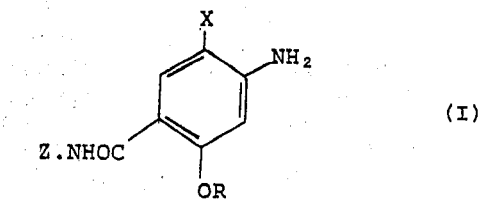

(I)

wherein X represents a chlorine or bromine atom, R represents a hydrogen atom or an alkyl group and Z represents a tertiary aminoalkyl group which comprises reacting a phthaloylamido compound of the following general formula:

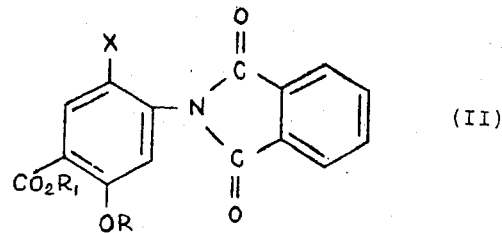

(II)

wherein X represents a chlorine or bromine atom, R represents a hydrogen atom or an alkyl group and $R_1$ represents an alkyl group, preferably a lower alkyl group, with an assymmetrically disubstituted diamine of the following general formula:

(III)

wherein Z has the same significance as in formula I hereinbefore. Conversion of the phthaloylamido compound of the foregoing general formula II into the benzamide compound of the foregoing general formula I is accomplished in a single-stage, one vessel reaction.

This process as used for making a preferred compound, N-(2-diethylaminoethyl)-2-methoxy-4-amino-5-chlorobenzamide, is illustrated by the following reaction scheme:

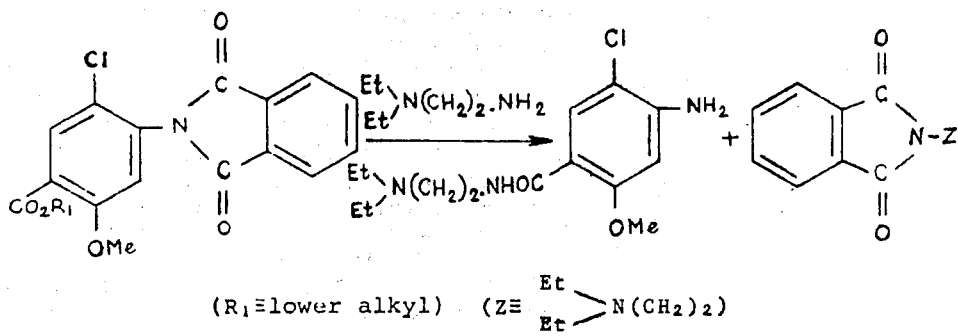

(R₁ ≡ lower alkyl)  (Z ≡ $\genfrac{}{}{0pt}{}{Et}{Et}$ >N(CH₂)₂)

If desired, the basic benzamide compounds so-obtained may be transformed by appropriate procedures into other compounds of the general formula I and/or into non-toxic acid addition or quaternary ammonium salts.

DETAILED DESCRIPTION OF THE INVENTION

The phthaloylamido compounds of the foregoing general formula II are esters of benzoic acid which are substituted with a hydroxy or alkoxy group, for example, methoxy, ethoxy, propoxy, butoxy and the like at the 2-position, a phthaloylamido group at the 4-position and a halogen atom such as a chlorine or bromine atom or the like at the 5-position thereof. Preferred esters are lower alkyl (C1 to C6) esters such, for example, as a methyl ester, ethyl ester, propyl ester, isopropyl ester, butyl ester and the like though equivalently functioning esters may also be used. These phthaloylamido compounds are new compounds which are further described and claimed, together with processes for preparing them, in the specification of our copending application Ser. No. 197,985, now U.S. Pat. No. 3,808,230. Briefly, they may be prepared from p-aminosalicylic acid as the starting material by processes involving at some stage therein the following:

a. esterification of the carboxylic acid function;
b. alkylation of the phenolic hydroxyl function;
c. protection of the reactive amino group by phthaloylation through reaction with phthalic anhydride; and
d. halogenation with the introduction of a chlorine or bromine atom as the case may be at the 5-position in the benzene ring.

The various steps that may be involved in making a desired N-(dialkylaminoalkyl)-2-alkoxy-4-amino-5-chloro (bromo)-benzamide from a p-aminosalicylic acid as the starting compound are illustrated in the following flow sheet:

FLOW SHEET I

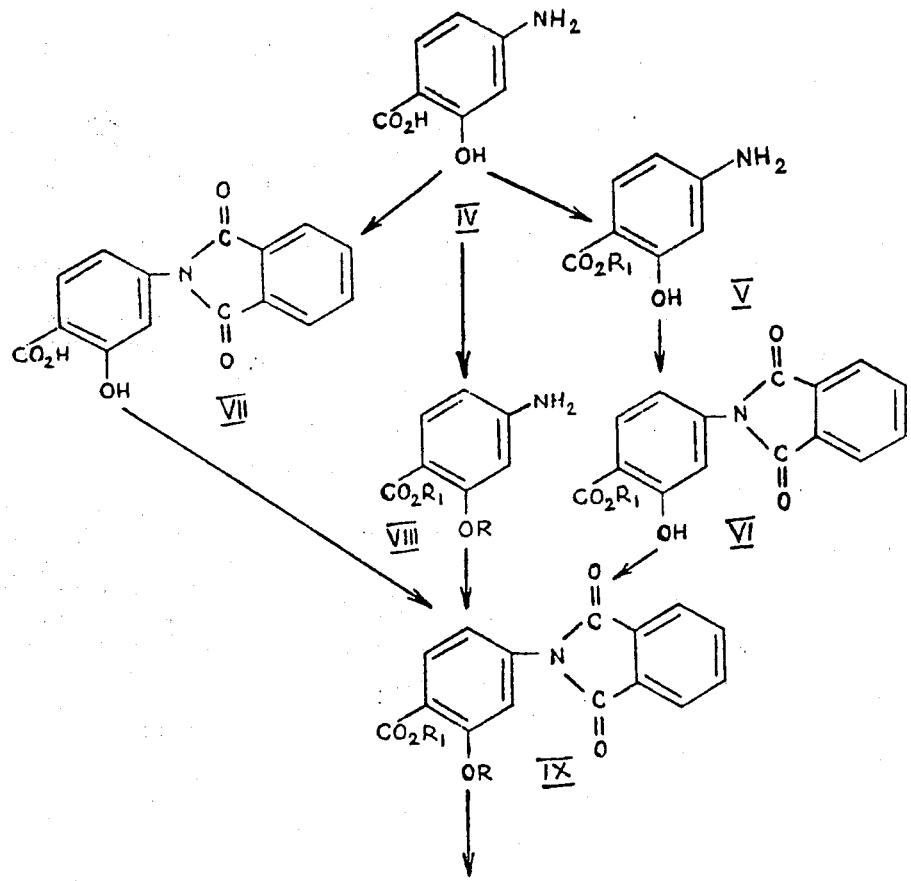

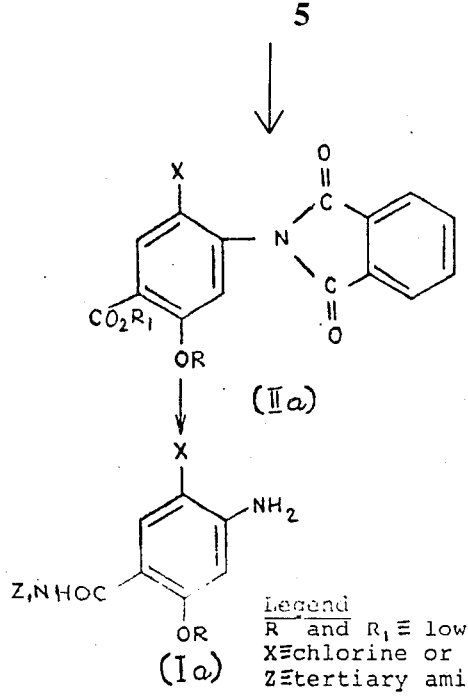

By utilizing the phthaloylamido compounds of the general formulae VI, VII, IX IIa as intermediates in this way, the desired benzamide compounds of the general formula I may be obtained in good yields from p-aminosalicylic acid in four or five reaction steps instead of six as in the process described in the aforementioned U.S. Pat. No. 3,357,978. Accordingly, this invention in another of its aspects provides a multi-stage process for making the desired benzamide compounds starting from p-aminosalicylic acid and proceeding at different stages therein, through novel phthaloylamido compounds. The different steps that may be involved in such a multi-stage process as applied to the preparation of a preferred compound, N-(2-diethylaminoethyl)-2-methoxy-4-amino-5-chlorobenzamide, are illustrated in the following flow sheet:

FLOW SHEET II

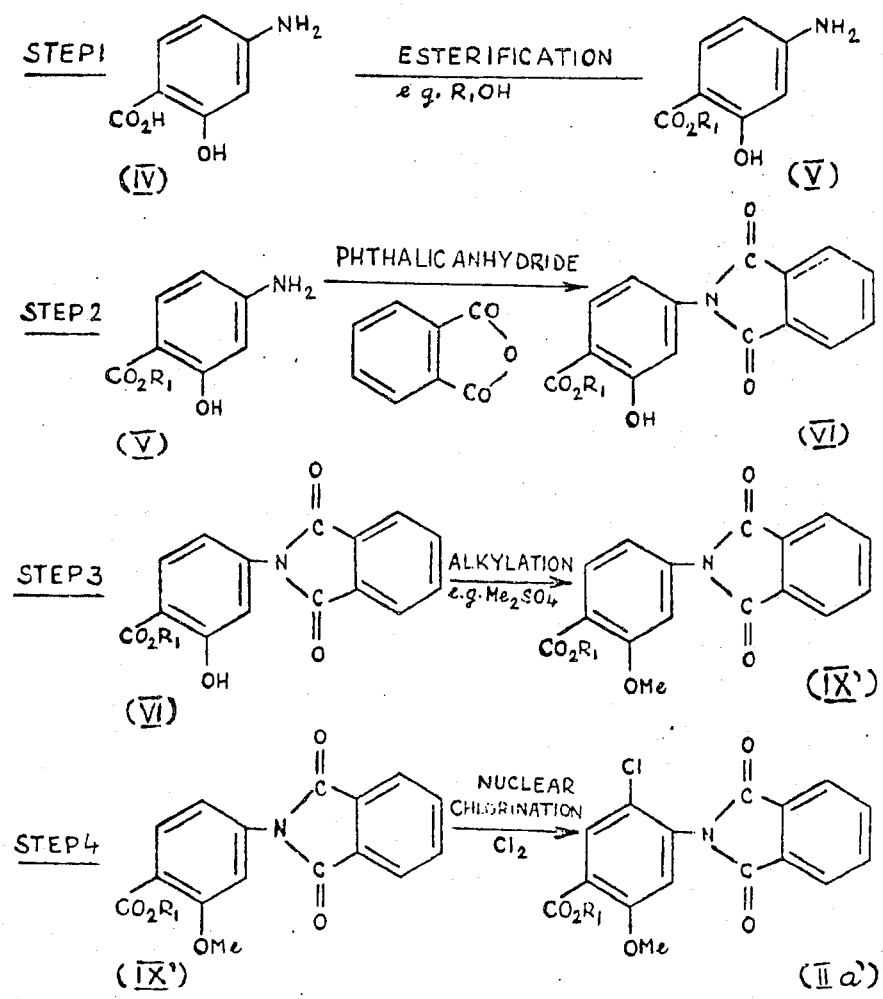

STEP 5

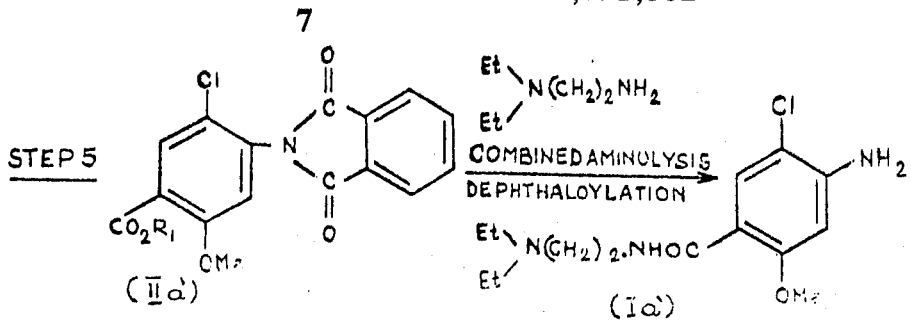

Legend

R₁ = lower alkyl.

In the conversion of the novel phthaloylamido compounds of the foregoing general formula II into the desired benzamide compounds of the foregoing general formula I the phthaloyl group is removed with the liberation of the free amine and the ester function concomitantly amidated with formation of the benzamide compound in a single-stage, one-vessel reaction by heating the alkyl 2-alkoxy-4-phthaloylamido-5-chloro(bromo)-benzoate with an appropriate asymmetrically disubstituted diamine of the general formula:

$$Z.NH_2 \qquad (X)$$

wherein Z is a tertiary aminoalkyl group such as diethylaminoethyl. Advantageously, at least 2 molar equivalents of the diamine, based upon the particular phthaloylamido reactant, are employed in the reaction. Desirably, the reaction should be conducted under substantially anhydrous conditions, since water in quite small amounts can deleteriously influence the reaction leading to poor yields. The reaction may be effected simply by heating the two reactants together in the absence of a solvent. Alternatively, an organic solvent, preferably anhydrous, may be used in which both reactants are at least partially soluble and which is inert to both reactants. Examples of suitable solvents include the relatively low boiling aliphatic alcohols like methanol, ethanol and isopropanol and the high boiling aromatic solvents like benzene, toluene and xylene. In one embodiment of this invention, the one-step reaction is carried out in the presence of a relatively large excess of the amine, say, 6 molar equivalents or more based upon the particular phthaloylamido reactant employed. In this way, the diamine may then serve as the solvent as well as a reactant for the dephthaloylation/aminolysis reaction. With the diamine as solvent, the reaction is commonly conducted at a temperature of between about 100°C. and 150°C., say 120°C. to 140°C. In another embodiment of this invention, an anhydrous organic solvent is used, say isopropanol, as a medium for the reaction. In this event, it is convenient to use around 2 molar equivalents of the diamine and to conduct the reaction at the reflux temperature of the solvent. Advantageously, a small amount of an aminolysis catalyst such, for example, as a metal alkoxide like aluminum isopropoxide is present for this is associated with the smoothest reaction and best yields. If desired, the reaction may be conducted under pressure. At the conclusion of the reaction, any excess, unreacted diamine may be removed by distillation, conveniently under reduced pressure. This simple, one-step dephthaloylation/aminolysis reaction, is particularly effective for the preparation of a preferred compound, N-(2-diethylaminoethyl)-2-methoxy-4-amino-5-chlorobenzamide, when the diamine reactant ($Z.NH_2$) is N,N-diethylethylenediamine, for, with this particular reactant, the reaction proceeds exceptionally smoothly to give excellent yields (typically as high as 85 to 90 percent) of the desired product in a single-stage, one vessel reaction. That the phthaloyl group may be removed in this way with regeneration of the free, i.e. unprotected, amino group using the same amine reactant as employed in the aminolysis of the ester, so providing for the formation of the desired benzamide in a single-step, one-vessel reaction, was surprising and unexpected. Thus, to the best of our knowledge, amines are not commonly used for removing a phthaloyl group with the liberation of a free amino group. Usually this is accomplished by heating the phthaloylamido compound with a strong acid, such as concentrated sulfuric acid, a strong inorganic base such as sodium hydroxide or with hydrazine hydrate (cf. Advances in Organic Chemistry, Vol. III, p. 182 - Interscience, 1963). Using this single-step dephthaloylation aminolysis reaction, the overall process starting from the p-aminosalicylic acid involves only 4 or 5 separate stages (depending upon whether the esterification and alkylation are effected in one or two stages), which is one or two less than in the process described hereinbefore with reference to U.S. Pat. No. 3,357,978. Moreover, especially when used in the preparation of N-(2-diethylaminoethyl)-2-methoxy-4-amino-5-chlorobenzamide, the desired compound is obtained in excellent yields, in a simple, expedient and economical process.

At the conclusion of the one-step dephthaloylation/aminolysis reaction, the benzamide compound so-formed, is readily isolated from the reaction medium, typically in crystalline form, say, by acid/base extraction followed by a conventional separation procedure, say, filtration or centrifuging. It may then be purified by recrystallization in the usual way from an organic solvent such, for example, as benzene or by chromatography.

The benzamide compounds of the general formula I may, if desired, be converted into salts such as non-toxic acid addition salts and quaternary ammonium salts, which are readily prepared from the basic amides. Thus, acid addition salts are formed by reacting the basic amides with an acid such, for example, as hydrochloric acid, hydrobromic acid, hydriodic acid, sulfuric acid, phosphoric acid, lactic acid, citric acid and tartaric acid to yield, respectively, the hydrochlorides, hydrobromides, hydriodides, sulfates, phosphates, lactates, citrates and tartrates. The quaternary ammonium salts may be prepared by treating the basic amide with lower alkyl and aralkyl esters of strong inorganic acids and organic sulfuric acids such, for example, as methyl chloride, methyl bromide, methyl iodide, ethyl bromide, propyl bromide, propyl iodide, benzyl chloride, benzyl bromide, methyl sulfate, methyl benzenesulfonate, methyl p-toluenesulfonate to yield respectively, the methochlorides, methobromides, methiodides, ethobromides, propobromides, propiodides, benzochlorides, benzobromides, methosulfates, methobenzenesulfates and metho-p-toluenesulfonates.

The following Examples are provided by way of further illustrating, but not limiting, the invention. In these Examples, the melting point data was obtained by the capillary tube procedure.

EXAMPLE 1

N-(2-diethylaminoethyl)-2-methoxy-4-amino-5-chlorobenzamide 10.36 Gms. (0.03 mole) methyl 2-methoxy-4-phthaloylamido-5-chlorobenzoate, 20.88 gms. (0.18 mole) N,N-diethylethylenediamine and 2.04 gms. (0.01 mole) aluminum isopropoxide as an aminolysis catalyst were placed in a 100 ml. round-bottom flask fitted with a mechanical stirrer. The large excess (6 molar equivalents) of the amine served as the solvent for the benzoate compound which went into solution on stirring. The mixture was heated, at 130° to 140°C., under these strictly anhydrous conditions, for 18 hours with continuous stirring. At the end of this period, the excess amine was distilled off under a reduced pressure of 15 mm.; 4 molar equivalents of the diamine, N,N-diethylethylenediamine, were recovered in this way. The residue was then cooled to 25°C., and the crude N-(diethylaminoethyl)-2-methoxy-4-amino-5-chlorobenzamide extracted therefrom and purified by conventional acid-base extraction involving conversion to the hydrochloride salt and then reprecipitation in the form of the free base by the procedure more fully described below.

A mixture of 12 ml. concentrated hydrochloric acid and 49 ml. water was added to the cooled residue. The resulting mixture was stirred at ambient temperature until the residue dissolved (15 minutes), and the solution basified to ph 10, while maintaining good stirring, by the addition of a 20 percent sodium hydroxide solution at 25°C. The desired, purified N-(2-diethylaminoethyl)-2-methoxy-4-amino-5-chlorobenzamide which precipitated out of solution was separated by filtration, washed with water and dried in a vacuum dessicator at 60°C. In this way, 7.8 gms. of the benzamide product in the form of off-white platelets were obtained (yield: 86 percent). A substantially pure product could be obtained by recrystallization from organic solvents such, for example, as benzene, methanol, ethanol or the like, or by chromatography. An analysis sample was recrystallized from benzene.

| Melting Point: | 140° to 143°C. | | (lit. 143° to 146°C.) | |
|---|---|---|---|---|
| Elementary analysis: | | | | |
| | C(%) | H(%) | Cl(%) | N(%) |
| Calculated: | 56.08 | 7.39 | 11.82 | 14.01 |
| $C_{14}H_{22}ClN_3O_2$ | | | | |
| Found: | 55.90 | 7.57 | 11.86 | 14.00 |

Infra-red spectrum:

The infra-red absorption spectrum of the compound taken in a potassium bromide dispersion showed the following characteristic absorption peaks and bands:

$\gamma$ NH 3400: 3320; 3220 cm.$^{-1}$
$\gamma$ CO 1635 cm.$^{-1}$

The presence of the desired N-(2-diethylaminoethyl)-2-methoxy-4-amino-5-chlorobenzamide in the reaction mixture after the single-step dephthaloylation/aminolysis reaction was established by thin layer chromatography on silica gel using 9 parts of chloroform and 1 part of methanol as the mobile phase. This was conducted after distillation of the excess amine. The presence of the desired N-(2-diethylaminoethyl)-2-methoxy-4-amino-5-chlorobenzamide in the reaction medium was also established by infra-red spectral analysis. Thus, the spectrum of the crude product after precipitation from the reaction mixture by treatment with water alone, at room temperature, for 15 minutes was substantially similar to that for the purified product. In particular, in this spectrum, the characteristic absorption band attributable to the phthaloylamido group, shown by all the phthaloylamido intermediates, at between about 1760 cm.$^{-1}$ and 1780 cm.$^{-1}$, was absent.

To establish the identity of the other product in the crude reaction mixture after distillation of the excess amine, the residue was treated with 30 mls. water at 25°C. The solid, which separated out, was filtered off and the aqueous filtrate evaporated to dryness. The oily residue was treated with a methanolic solution of hydrogen chloride gas and again evaporated to dryness. The solid so-obtained was stirred with 10 mls. acetone, filtered and dried in a vacuum dessicator at 60°C. The product, N-($\beta$-diethylaminoethyl)-phthalimide hydrochloride, melting point 239° to 243°C., was found to be identical with an authentic sample by a mixed melting point determination (no depression of the melting point) and infra-red spectral analysis taken in a potassium bromide dispersion which showed characteristic absorption peaks and bands at the following wavelengths:

$\gamma$NH$^+$ 2570; 2470 cm.$^{-1}$
$\gamma$CO 1775; 1710 cm.$^{-1}$

The methyl 2-methoxy-4-phthaloylamido-5-chlorobenzoate used as the starting material for the one step dephthaloylation/aminolysis reaction was obtained from p-aminosalicylic acid by the following four-stage procedure.

Part A

Methyl p-aminosalicylate

330 Mls. of absolute methanol were introduced into a 1 litre round-bottom flask fitted with a mechanical stirrer and a reflux condenser, and 136 gms. concentrated sulfuric acid (98 percent) were added in small portions while cooling the flask. Finally, 45.9 gms. (0.3 mole) of p-aminosalicylic acid were added, and the suspension so-obtained heated under reflux, with continuous stirring, for 5 hours. The solution was cooled to ambient temperature (25°C.) and then poured, with continued stirring, into a solution of 136.5 gms. of dry sodium carbonate in 1.3 litres of water. The methyl p-aminosalicylate so-formed precipitated out of solution and was separated by filtration, washed with water until disappearance of sulfate ions, then dried in a vacuum dessicator at 60°C. 44.2 Gms. of the product were obtained as off-white crystals; melting point: 114° to 117°C.; yield 88 percent.

Part B

Methyl p-phthaloylamidosalicylate 33.4 Gms. (0.2 mole) methyl p-aminosalicylate obtained by the procedure of Part A of this Example, 29.6 gms. (0.2 mole) phthalic anhydride and 2.02 gms. triethylamine (as a basic condensation catalyst) were added to 400 ml. anhydrous toluene as solvent in a 1 litre round-bottom flask fitted with a mechanical stirrer and a reflux condenser with a water trap. The mixture was then refluxed for 3½ hours while stirring continuously. It was then cooled to 0°C. on an ice bath, when the desired methyl p-phthaloylamido salicylate precipitated out in the form of a crystalline solid. This solid was separated from the solution by filtration, suspended in 200 ml. methanol and the suspension stirred for 30 minutes at ambient temperature. Thereafter, the purified methyl p-phthaloylamidosalicylate was recovered by filtration and dried at 80°C. in a vacuum dessicator to give 49 gms. (yield: 83%) of the product in the form of white, needle-shaped crystals. An analysis sample was recrystallized from acetone.

| Melting point: | 215° to 217°C. | | |
|---|---|---|---|
| Elementary analysis: | | | |
| | C(%) | H(%) | N(%) |
| Calculated: $C_{16}H_{11}NO_5$ | 64.64 | 3.73 | 4.71 |
| Found: | 64.75 | 3.70 | 4.56 |

Infra-red

The infra-red spectrum of the compound in a Nujol mull showed characteristic absorption peaks and bands at the following wavelengths:

$\gamma$CO(phthaloyl) 1788; 1770; 1710 cm.$^{-1}$
$\gamma$CO(ester) 1675 cm.$^{-1}$ Part C Methyl 2-methoxy-4-phthaloylamidobenzoate 29.7 Gms. (0.1 mole) methyl p-phthaloylamido salicylate obtained by the procedure of Part B of this Example were added to 550 ml. anhydrous acetone in a 1 litre round-bottom flask fitted with a mechanical stirrer and a reflux condenser. 27.6 Gms. (0.2 mole) powdered anhydrous potassium carbonate were added to the suspension followed by 13.86 gms. (0.11 mole) dimethyl sulfate, which was added slowly while continuously stirring. The mixture was refluxed for 20 hours. Thereafter, the bulk of the acetone was distilled off, and the residue, which was a thick paste, cooled to about 50°C. and diluted with 500 ml. water. The resultant suspension was stirred at ambient temperature for 30 minutes. The solid product, methyl 2-methoxy-4-phthaloylamidobenzoate, was separated by filtration, washed with water until neutral and then dried in a vacuum dessicator at 80°C. 30.1 Gms. of the product, as white, needle-shaped crystals, were obtained (yield: 97 percent). An analysis sample was recrystallized from acetone.

| Melting point: | 151° to 153°C. | | |
|---|---|---|---|
| Elementary analysis: | | | |
| Calculated: $C_{17}H_{13}NO_5$ | 65.59 | 4.50 | 4.2 |
| Found: | 65.38 | 4.65 | 4.07 |

Infra-red spectrum:

The infra-red spectrum of the compound in a Nujol mull showed characteristic absorption peaks and bands at the following wavelengths:

$\gamma$CO(phthaloyl) 1775; 1750; 1720 cm.$^{-1}$
$\gamma$CO(ester) 1687 cm.$^{-1}$ Part D Methyl 2-methoxy-4-phthaloylamido-5-chlorobenzoate 15.55 Gms. (0.05 mole) methyl 2-methoxy-4-phthaloylamidobenzoate obtained by the procedure of Part C of this Example and 250 ml. glacial acetic acid were introduced into a 1 litre round-bottom flask fitted with a mechanical stirrer, a thermometer and a dropping funnel. While the mixture was stirred continuously, there was added a solution comprising 3.9 gms. (0.055 mole) chlorine gas dissolved in 50 ml. glacial acetic acid. The mixture was stirred at ambient temperature for 1½ hours. Thereafter, the reaction mixture was poured into 1500 ml. of cold water. The resulting precipitate, methyl 2-methoxy-4-phthaloylamido-5-chlorobenzoate, was separated by filtration, and added to 500 ml. saturated aqueous sodium bicarbonate solution. The suspension was stirred for 30 minutes, after which the product was filtered off, washed with water until there was no trace of chloride ions, then dried at 60°C. in a vacuum dessicator. 16.6 Gms. of the desired methyl 2-methoxy-4-phthaloylamido-5-chlorobenzoate were obtained (yield: 96 percent). An analysis sample was recrystallized from methanol.

| Melting Point: | 119° to 120°C. | | | |
|---|---|---|---|---|
| Elementary analysis: | | | | |
| | C(%) | H(%) | Cl(%) | N(%) |
| Calculated: $C_{17}H_{12}ClNO_5$ | 59.05 | 3.50 | 10.25 | 4.05 |
| Found: | 59.14 | 3.41 | 10.42 | 4.26 |

Infra-red Spectrum:

The infra-red spectrum of the compound in a Nujol mull showed characteristic absorption peaks and bands at the following wavelengths:

$\gamma$CO 1775; 1755; 1720 cm.$^{-1}$

The overall yield of the desired N-(2-diethylaminoethyl)-2-methoxy-4-amino-5-chlorobenzamide in the five stage process starting from p-aminosalicylic acid was 58.5 percent.

EXAMPLE 2

N-(2-Diethylaminoethyl)-2-methoxy-4-amino-5-chlorobenzamide

Methyl 2-methoxy-4-phthaloylamido-5-chlorobenzoate obtained following the same procedure as set forth in Parts A to D of the foregoing Example was converted into the desired benzamide following the single step dephthaloylation/aminolysis procedure of the foregoing Example except that the aluminum isopropoxide aminolysis catalyst was omitted. In this instance, 5.4 gms. of the desired benzamide product were obtained after work-up of the reaction mixture. The yield of 60 percent was lower than the 86 percent yield in the aminolysis step of Example 1 conducted in the presence of the aminolysis catalyst. Thus, though the presence of a catalyst is not necessary, it is generally associated with the obtention of maximum yields and the smoothest reaction.

EXAMPLE 3

N-(2-Diethylaminoethyl)-2-methoxy-4-amino-5-chlorobenzamide

The single step dephthaloylation/aminolysis procedure of Example 1 was repeated exactly but, in this instance, the methyl 2-methoxy-4-phthaloylamido-5-chlorobenzoate was obtained from p-aminosalicylic acid by the following three-stage procedure.

Part A

Para-phthaloylamidosalicylic acid 30.6 Gms. (0.2 mole) salicylic acid, 29.6 gms. phthalic anhydride and 2.02 gms. triethylamine, as a basic condensation catalyst, were added to 400 ml. anhydrous toluene as solvent in a 1 litre round-bottom flask fitted with a mechanical stirrer, reflux condenser and a water trap. The mixture was refluxed for 3½ hours with continuous stirring. It was then cooled to 0°C. on an ice bath when the desired p-phthaloylamidosalicylic acid precipitated out in the form of a white crystalline solid. This solid was filtered off, suspended in 200 ml. of anhydrous methanol and stirred at 25°C. for 30 minutes. The purified product was filtered off and dried at 60°C. in an air oven, to give 43.3 gms. (yield 76.5 percent) of the product in the form of needle-shaped, white crystals. An analysis sample was recrystallized from acetone.

| Melting Point: | 295° to 297°C. | | |
|---|---|---|---|
| Elementary analysis: | | | |
|  | C(%) | H(%) | N(%) |
| Calculated: | 63.60 | 3.18 | 4.94 |
| $C_{15}H_9NO_5$ | | | |
| Found: | 63.34 | 3.21 | 4.95 |

Infra-red spectrum:
The infra-red spectrum of the compound taken in a potassium bromide dispersion showed characteristic absorption bands and peaks at the following wavelengths:
$\gamma CO$(phthaloyl) 1780; 1765; 1730 cm.$^{-1}$
$\gamma CO$ (acid) 1670 cm.$^{-1}$ Part B
Methyl 2-Methoxy-4-Phthaloylamidobenzoate A mixture comprising 22.65 gms. (0.08 mole) p-phthaloylamidosalicylic acid, obtained by the procedure of Part A of this Example, 27.6 gms. (0.2 mole) powdered anhydrous potassium carbonate and 250 mls. anhydrous acetone as solvent was stirred for 30 minutes at 25°C. in a 1 litre round-bottom flask. 22.16 Gms. (0.176 mole) dimethyl sulfate were slowly added to the continuously stirred suspension. The resulting mixture was refluxed for 20 hours. The bulk of the acetone was then distilled off under reduced pressure, and the residue cooled to 25°C., after which 500 mls. of water were added thereto.

The solid product, methyl 2-methoxy-4-phthaloylamido benzoate, was separated by filtration, washed with water until neutral and dried at 60°C. in an air oven, to give 24.7 gms. (yield: 97 percent) of the product in the form of a white powder. An analysis sample was recrystallized from acetone.

| Melting Point | 151° to 153°C. | | |
|---|---|---|---|
| Elementary analysis: | | | |
|  | C(%) | H(%) | N(%) |
| Calculated: | 65.59 | 4.50 | 4.20 |
| $C_{17}H_{13}NO_5$ | | | |
| Found: | 65.38 | 4.61 | 4.13 |

Infra-red
The infra-red spectrum of the compound taken in a potassium bromide dispersion showed characteristic absorption bands and peaks at the following wavelengths:
$\gamma CO$(phthaloyl) 1775; 1750; 1720 cm.$^{-1}$
$\gamma CO$(ester) 1687 cm.$^{-1}$ Parts C and D
Methyl 2-methoxy-4-phthaloylamido-5-chlorobenzoate This compound was prepared from methyl 2-methoxy-4-phthaloylamidobenzoate obtained by the procedure of Part B of this Example following the same procedure as set forth in Part D of Example 1.

EXAMPLE 4

N-(2-Diethylaminoethyl)-2-methoxy-4-amino-5-chlorobenzamide

The single step dephthaloylation/aminolysis procedure of Example 1 was repeated exactly except that the methyl ester was replaced by 10.3 gms. (0.03 mole) of ethyl 2-methoxy-4-phthaloylamido-5-chlorobenzoate obtained following similar procedures to those set forth in Parts A to D of Example 1 except that, in Part A, the absolute methanol as the esterifying agent was replaced by 260 mls. ethanol. In this way, 3.6 gms. of the crystalline benzamide product in the form of off-white, platelets were obtained (yield: 40 percent). An analysis sample, recrystallized from benzene, had a melting point of 140° to 143°C.

EXAMPLE 5

N-(2-Diethylaminoethyl)-2-methoxy-4-amino-5-chlorobenzamide

The single step dephthaloylation/aminolysis procedure of Example 1 was repeated exactly except that the methyl ester was replaced by 11.2 gms. (0.03 mole) of isopropyl 2-methoxy-4-phthaloylamido-5-chlorobenzoate obtained following similar procedures to those set forth in Parts A to D of Example 1 except that, in Part A, the absolute methanol as esterifying agent was replaced by 320 mls. isopropanol. In this way, 3.4 gms. of the benzamide product were obtained. An analysis sample, recrystallized from benzene, had a melting point of 140° to 143°C.

EXAMPLE 6

N-(2-Diethylaminoethyl)-2-methoxy-4-amino-5-chlorobenzamide 110.5 Kgs. (320 moles) methyl 2-methoxy-4-phthaloylamido-5-chlorobenzoate, 78.5 kgs. (740 moles) N,N-diethylethylenediamine and 27.3 kgs. (134 moles) aluminum isopropoxide, as an aminolysis catalyst, were added to 145 litres of isopropanol solvent in a glass-lined reaction vessel. The reaction mixture was refluxed to effect the combined dephthaloylation-/aminolysis reaction and, thereafter, the isopropanol was removed by distillation under reduced pressure. The benzamide free base was obtained from the distillation residue using a conventional acid-base extraction procedure as described below. About 725 kgs. of 6.7 percent aqueous hydrochloric acid were added to the distillation residue and the resulting suspension stirred for 1 hour at 20°C., then filtered. The collected filtrate was extracted with about 410 litres of toluene by mixing for 30 minutes. The toluene phase was discarded and the aqueous phase cooled to 10°C. Addition of aqueous 4.5 percent sodium hydroxide with stirring until a pH value of 10 was reached, produced a precipitate. Prior to recovery, the suspension was agitated for one hour at 20° – 25°C., and then centrifuged and washed with water until the washings reached pH 7. The remaining solid material was dried at 60°C. in an atmospheric dryer to yield 85.5 kgs. of metaclopramide base.

This material was then purified by recrystallization from acetone to give the desired fine product in 85% overall yield.

EXAMPLE 7

N-(2-Diethylaminoethyl)-2-methoxy-4-amino-5-chlorobenzamide dihydrochloride monohydrate 24 Gms. (0.08 mole) of the basic benzamide compound obtained by the procedure of Example 1 herein were suspended in 100 ml. of anhydrous acetone. To the stirred suspension was added with cooling a solution of 6.6 gms. (0.18 mole) of gaseous hydrogen chloride in 60 ml. of absolute methanol and 1.5 ml. of water. The resulting solution was stirred at ambient temperature for 15 minutes and then refluxed with 3 gms. of animal charcoal. The cooled mixture was filtered and the filtrate cooled to 0°C. 20 Mls. of anhydrous acetone were added slowly with continued stirring, and after 30 minutes further stirring at 0°C. the precipitate was filtered and dried in a vacuum dessicator at 40°C. 31 Gms. of N-(2-diethylaminoethyl)-2-methoxy-4-amino-5-chlorobenzamide dihydrochloride monohydrate were obtained (melting point: 143° to 145°C.; yield: 99 percent).

While the foregoing description refers to the preparation of certain illustrative benzamide compounds of the foregoing general formula I and phthaloylamido compounds of the foregoing general formula II useful in the preparation thereof, it will be understood that the invention is not limited thereto, and numerous modifications and variations may be made without departing from the spirit of the invention. It is also to be understood that the following claims are intended to cover all the generic and specific features of the invention which as a matter of language, might be said to fall therebetween.

What is claimed is:

1. A process for making a benzamide compound having the formula:

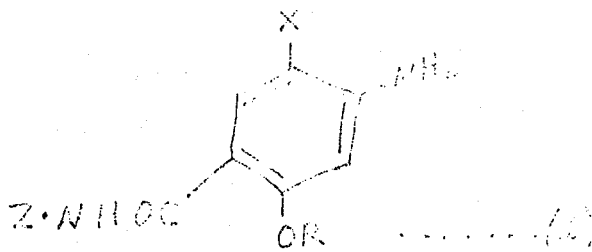

wherein X represents a chlorine or bromine atom, R represents a hydrogen atom or an alkyl group and Z is a tertiary amino alkyl group, which comprises reacting a phthaloylamido compound having the formula:

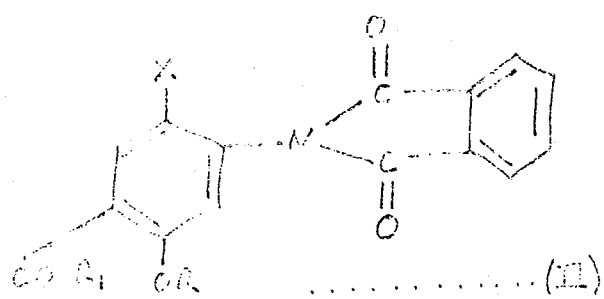

wherein X and R each have the same meaning as in the foregoing formula I and $R_1$ is an alkyl group, with an asymetrically disubstituted diamine having the formula:

$$Z.NH_2$$

wherein Z has the same meaning as in the foregoing formula I, whereby dephthaloylation and aminolysis are accomplished in a single-stage, one-vessel reaction, said reaction being conducted in the presence of aluminum isopropoxide, which is an aminolysis catalyst, said reaction being conducted at a temperature between about 100° and 150°C., said reaction being conducted under substantially anhydrous conditions, and the molar ratio of said diamine to said phthaloylamido compound being at least six, the excess amount of said diamine being a solvent for said reaction.

2. A process as claimed in claim 1 wherein in the compound of formula II, X represents a chlorine atom, and R and $R_1$ represent lower alkyl.

3. A process as claimed in claim 1 wherein methyl-2-methoxy-4-phthaloylamido-5-chlorobenzoate is reacted with N,N-diethylethylenediamine, whereby N-(2-diethylaminoethyl)-2-methoxy-4-amino-5-chlorobenzamide is produced.

4. A process as claimed in claim 1 which comprises: (a) reacting a lower alkyl-2-methoxy-4-phthaloylamido-5-chlorobenzoate with at least 6 molar equivalents of N,N-diethylethylendiamine, based upon the amount present of said lower alkyl 2-methoxy-4-phthaloyl-amido-5-chlorobenzoate; (b) at the end of the reaction period, distilling off the excess diamine; and (c) then separating the resultant N-(2-diethylaminoethyl)-2-methoxy-4-amino-5-chlorobenzamide.

5. A process as claimed in claim 4 wherein said lower alkyl 2-methoxy-4-phthaloylamido-5-chlorobenzoate is methyl 2-methoxy-4-phthaloylamido-5-chlorobenzoate.

6. A process as claimed in claim 4 wherein said lower alkyl 2-methoxy-4-phthaloylamido-5-chlorobenzoate is ethyl-2-methoxy-4-phthaloylamido-5-chlorobenzoate.

7. A process as claimed in claim 4 wherein said lower alkyl 2-methoxy-4-phthaloylamido-5-chlorobenzoate is isopropyl 2-methoxy-4-phthaloylamido-5-chlorobenzoate.

8. A process for making a benzamide compound having the formula:

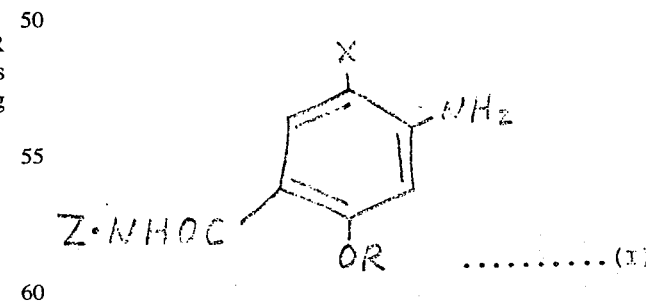

wherein X represents a chlorine or bromine atom, R represents a hydrogen atom or an alkyl group and Z is a tertiary amino alkyl group, which comprises reacting a phthaloylamido compound having the formula:

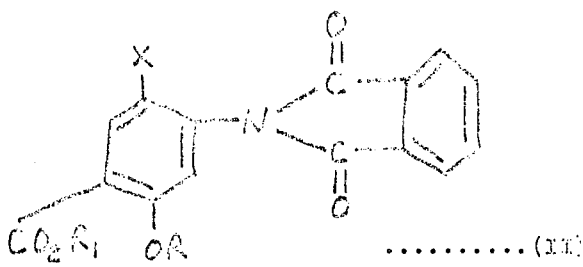

........ (II)

wherein X and R each have the same meaning as in the foregoing formula I and $R_1$ is an alkyl group, with an asymetrically disubstituted diamine having the formula:

$$Z.NH_2 \quad \text{(III)}$$

wherein Z has the same meaning as in the foregoing formula I, whereby dephthaloylation and aminolysis are accomplished in a single-stage, one-vessel reaction, said reaction being conducted under substantially anhydrous conditions, wherein said reaction is conducted in an anhydrous organic solvent which is substantially inert to both reactants, wherein said reaction is conducted at the reflux temperature of the organic solvent, wherein said reaction is conducted in the presence of aluminum isopropoxide, which is an aminolysis catalyst, and the molar ratio of said diamine to said phthaloylamido compound being at least two.

9. A process as claimed in claim 8 wherein the compound of formula II, X represents a chlorine atom, and R and $R_1$ represent lower alkyl.

10. A process as claimed in claim 8 wherein methyl-2-methoxy-4-phthaloylamido-5-chlorobenzoate is reacted with N,N-diethylethylenediamine, whereby N-(2-diethylaminoethyl)-2-methoxy-4-amino-5-chlorobenzamide is produced.

11. A process as claimed in claim 8 wherein said reaction is conducted in, as said solvent, anhydrous xylene, anhydrous toluene, or a lower aliphatic alcohol.

12. A process as claimed in claim 11 wherein said solvent is isopropanol.

13. A process as claimed in claim 8 which comprises: reacting a lower alkyl-2-methoxy-4-phthaloylamido-5-chlorobenzoate with at least 2 molar equivalents of N,N-diethylethylendiamine, based upon the amount present of said lower alkyl-2-methoxy-4-phthaloylamido-5-chlorobenzoate; and, at the end of the reaction period, separating the resultant N-(2-diethylaminoethyl)-2-methoxy-4-amino-5-chlorobenzamide from said solvent.

14. A process as claimed in claim 13 wherein said lower alkyl 2-methoxy-4-phthaloylamido-5-chlorobenzoate is methyl 2-methoxy-4-phthaloylamido-5-chlorobenzoate.

15. A process as claimed in claim 13 wherein said lower alkyl 2-methoxy-4-phthaloylamido-5-chlorobenzoate is ethyl 2-methoxy-4-phthaloylamido-5-chlorobenzoate.

16. A process as claimed in claim 13 wherein said lower alkyl 2-methoxy-4-phthaloylamido-5-chlorobenzoate is isopropyl 2-methoxy-4-phthaloylamido-5-chlorobenzoate.

17. A process as claimed in claim 8 wherein a lower alkyl 2-methoxy-4-phthaloylamido-5-chlorobenzoate is reacted with between about 2 and 2.1 molar equivalents of a N,N-diethyl-ethylenediamine, based upon the amount present of said lower alkyl 2-methoxy-4-phthaloylamido-5-chlorobenzoate compound, in a lower aliphatic alcohol, as said solvent.

18. A process as claimed in claim 17 wherein said solvent is isopropanol.

* * * * *